US012268114B2

(12) United States Patent
Steinlage et al.

(10) Patent No.: US 12,268,114 B2
(45) Date of Patent: Apr. 8, 2025

(54) HINGED AGRICULTURAL EQUIPMENT

(71) Applicant: DEERE & COMPANY, Moline, IL (US)

(72) Inventors: David L. Steinlage, Centralia, KS (US); Jeremy Nefzger, Alleman, IA (US); Luc Janelle, Ankeny, IA (US); Trond A. Svidal, Crestwood, KY (US); Padmanabh Limaye, Bengaluru (IN)

(73) Assignee: DEERE & COMPANY, Moline, IL (US)

( * ) Notice: Subject to any disclaimer, the term of this patent is extended or adjusted under 35 U.S.C. 154(b) by 713 days.

(21) Appl. No.: 17/412,647

(22) Filed: Aug. 26, 2021

(65) Prior Publication Data

US 2023/0065279 A1 Mar. 2, 2023

(51) Int. Cl.
*A01B 73/06* (2006.01)
*A01B 33/08* (2006.01)
*A01C 7/08* (2006.01)

(52) U.S. Cl.
CPC .............. *A01B 73/06* (2013.01); *A01B 33/08* (2013.01); *A01C 7/08* (2013.01)

(58) Field of Classification Search
CPC ....... A01B 73/06; A01B 33/08; A01B 63/008; A01B 73/044; A01C 7/08
See application file for complete search history.

(56) References Cited

U.S. PATENT DOCUMENTS

| 10,888,044 B2 | 1/2021 | Kinzenbaw et al. |
| 2019/0150353 A1 | 5/2019 | Schlimgen et al. |
| 2020/0053951 A1 | 2/2020 | Becker et al. |

FOREIGN PATENT DOCUMENTS

| BR | 1020130267457 B1 | 6/2019 | |
| EP | 4140274 A1 * | 3/2023 | ............. A01B 33/08 |

OTHER PUBLICATIONS

Extended European Search Report and Written Opinion issued in European Patent Application No. 22182655.5, dated Dec. 15, 2022, in 10 pages.
Stara; Estrela, Being Big Isn't Enough, It Got to be Estrela!; 5 pages.
Extended European Search Report; European Patent Office; European Patent Application No. 23189210.0; 12 pages.

* cited by examiner

*Primary Examiner* — Arpad Fabian-Kovacs
(74) *Attorney, Agent, or Firm* — Taft Stettinius & Hollister LLP; Stephen F. Rost

(57) ABSTRACT

An example form of mobile agricultural equipment generally includes a main frame, a wing frame, and a hinge mechanism. The main frame defines a track, and the wing frame has a roller rotatably mounted thereon. The hinge mechanism movably couples the main frame with the wing frame such that the wing frame is movable relative to the main frame between a first orientation and a second orientation. The hinge mechanism generally includes a sub-hinge plate pivotably coupled with the main frame, a first link pivotably coupled to each of the wing frame and the sub-hinge plate, and a second link pivotably coupled to each of the wing frame and the sub-hinge plate. The roller is configured to travel along the track during a portion of a movement of the wing frame between the first orientation and the second orientation to thereby provide support for the wing frame.

20 Claims, 13 Drawing Sheets

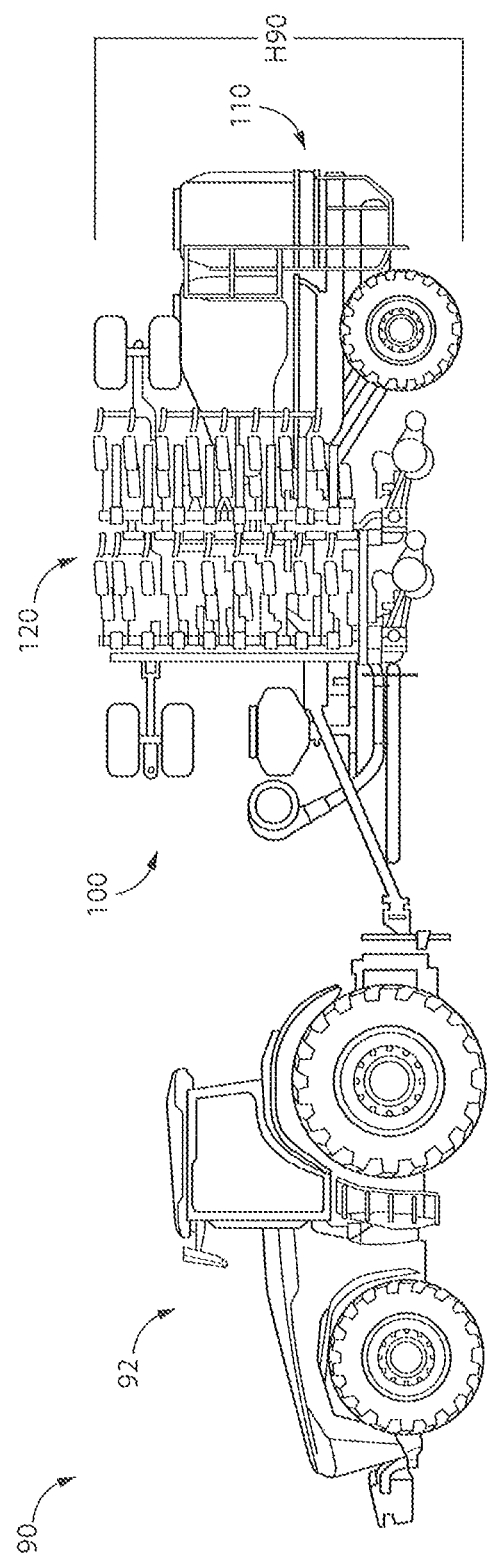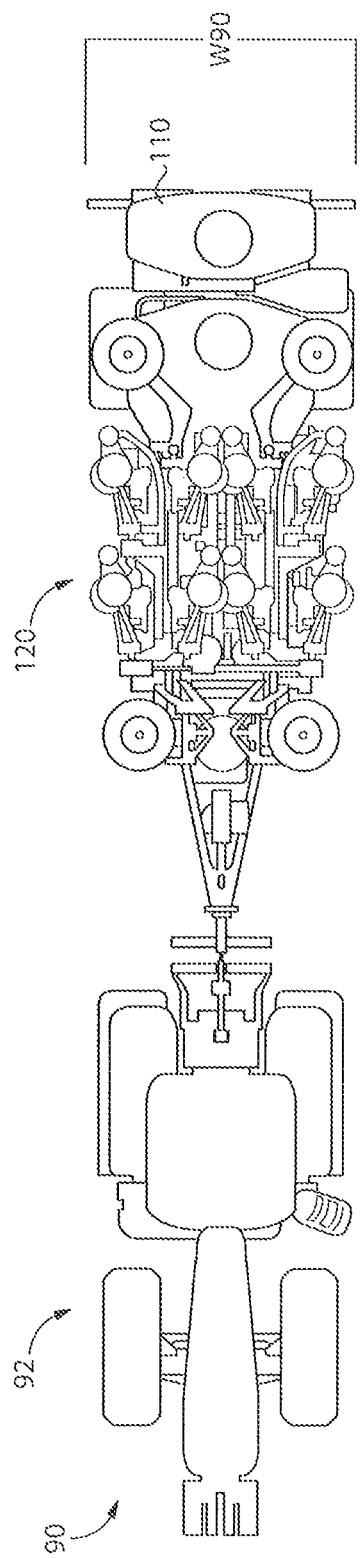

HINGED AGRICULTURAL EQUIPMENT

TECHNICAL FIELD

The present disclosure generally relates to hinged agricultural equipment, and more particularly but not exclusively relates to hinged work machines such as seeders and tillers.

BACKGROUND

Certain types of agricultural equipment generally include a chassis and a wing pivotably attached to the chassis such that the wing is able to pivot during travel of the equipment over uneven terrain. In certain markets, there is a need for the wing to have the ability to fold to a substantially vertical orientation for transport. However, conventional hinge mechanisms for providing such an ability to fold suffer from certain drawbacks and limitations. For these reasons among others, there remains a need for further improvements in this technological field.

SUMMARY

An exemplary form of mobile agricultural equipment generally includes a main frame, a wing frame, and a hinge mechanism. The main frame defines a track, and the wing frame has a roller rotatably mounted thereon. The hinge mechanism movably couples the main frame with the wing frame such that the wing frame is movable relative to the main frame between a first orientation and a second orientation. The hinge mechanism generally includes a sub-hinge plate pivotably coupled with the main frame, a first link pivotably coupled to each of the wing frame and the sub-hinge plate, and a second link pivotably coupled to each of the wing frame and the sub-hinge plate. The roller is configured to travel along the track during a portion of a movement of the wing frame between the first orientation and the second orientation to thereby provide support for the wing frame. Further embodiments, forms, features, and aspects of the present application shall become apparent from the description and figures provided herewith.

BRIEF DESCRIPTION OF THE FIGURES

FIG. 21 is a side view of agricultural equipment including the work machine with the work machine in the second configuration.

FIG. 22 is a top-down view of agricultural equipment including the work machine with the work machine in the second configuration.

DETAILED DESCRIPTION OF ILLUSTRATIVE EMBODIMENTS

Figure 1:
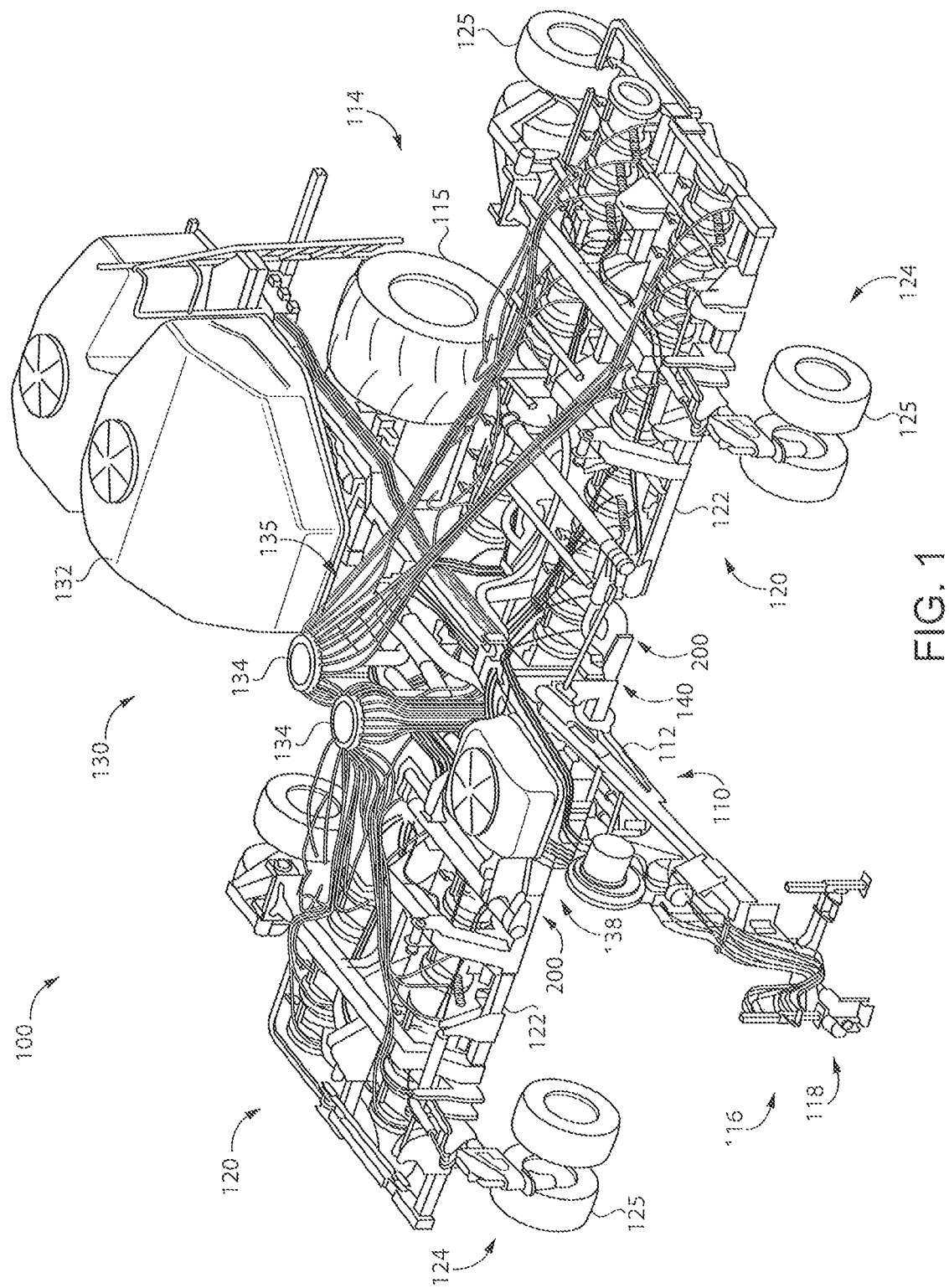
FIG. 1 is a perspective illustration of a work machine according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 2:
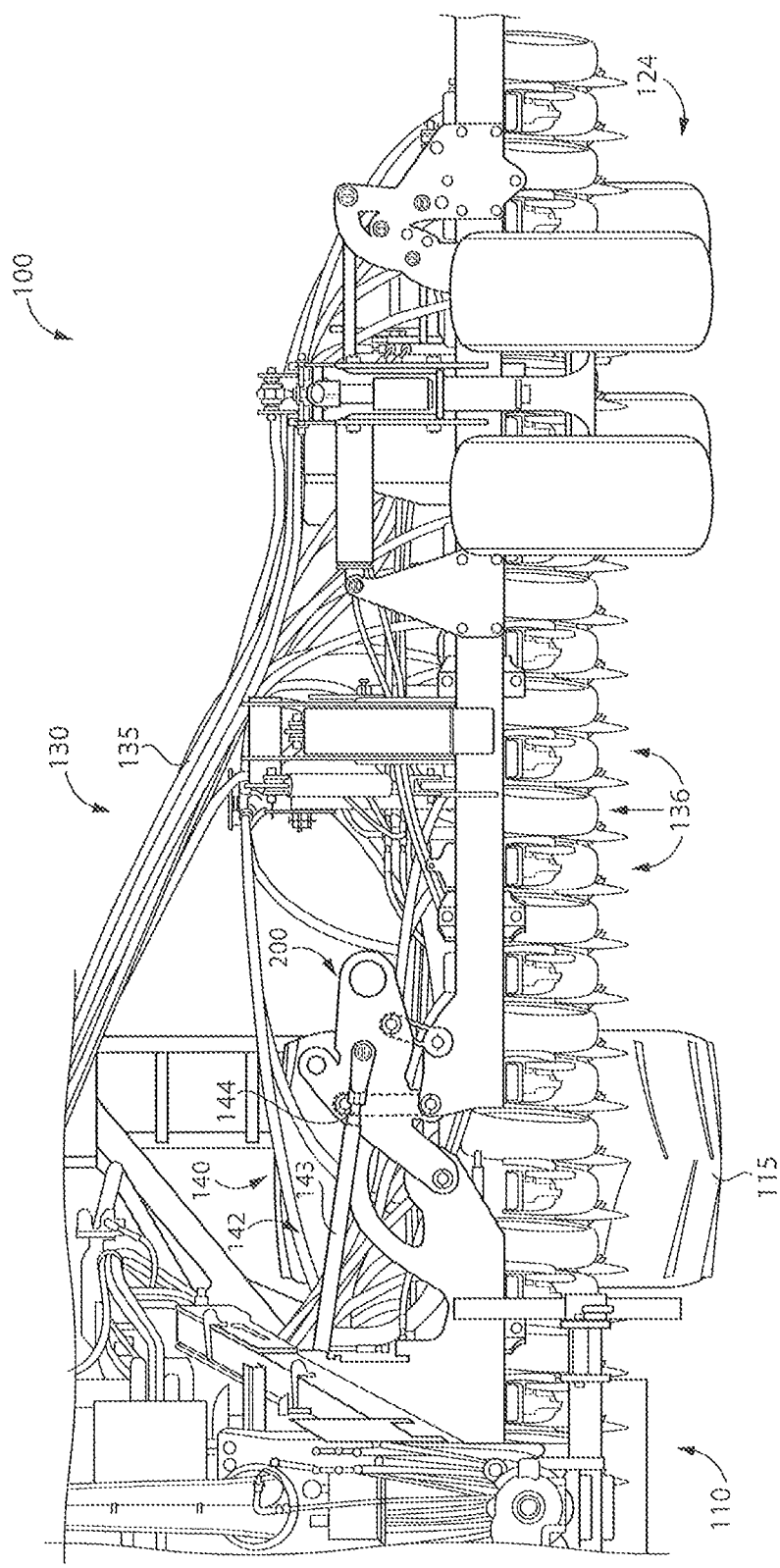
FIG. 2 is a front view of a portion of the work machine including a wing.

With reference to FIGS. 1 and 2, illustrated therein is mobile agricultural equipment in the form of a work machine 100 according to certain embodiments. The work machine 100 generally includes a chassis 110, at least one wing 120, a work system 130 distributed across the chassis 110 and the at least one wing 120, an actuator assembly 140 operable to pivot each wing 120 relative to the chassis 110 between a first orientation and a second orientation, and at least one hinge mechanism 200, each hinge mechanism 200 pivotably connecting the chassis 110 with a corresponding wing 120. As described herein, the work machine has a first configuration (FIG. 1) in which the work machine 100 is operable to perform the primary function for which the work machine 100 was designed (e.g., distribution or tilling), and a second configuration (FIGS. 21 and 22) in which the work machine 100 is more suitable for road transportation. The first configuration may alternatively be referred to herein as the operational configuration, and the second configuration may alternatively be referred to herein as the road transport configuration.

The chassis 110 generally includes a main frame 112 and a primary ground interface assembly 114 mounted to the main frame 112. A front end of the main frame 112 includes a hitch 116 for connecting the chassis 110 to a towing vehicle, such as a tractor. In the illustrated form, the ground interface assembly 114 is provided in the form of at least one wheel 115, and more particularly as a plurality of wheels 115. It is also contemplated that the ground interface assembly 114 may include additional or alternative features, such as one or more skids. A connector 118 is provided near the hitch 116 to facilitate connection of the work system 130 and/or the actuator assembly 140 with the control system of the towing vehicle.

Each wing 120 generally includes a wing frame 122 and a secondary ground interface assembly 124 mounted to the wing frame 122. In the illustrated form, the ground interface assembly 124 is provided in the form of at least one wheel 125, and more particularly as a plurality of wheels 125. It is also contemplated that the ground interface assembly 124 may include additional or alternative features, such as one or more skids.

The work system 130 is configured to perform a work function corresponding to the primary function of the work machine 100, and in the illustrated form is provided as an air-based distributor system that distributes agricultural product (e.g., seed, fertilizer, and/or pesticide) from a reservoir 132 to the ground. The illustrated work system 130 further includes a distribution tower 134 that distributes agricultural product to a plurality of outlets 136 via distribution lines 135, and a blower 138 that blows agricultural product from the reservoir 132 through the tower 134 and to the outlets 136. At least some of the outlets 136 are mounted to and/or included in the at least one wing 120, and additional outlets 136 may be mounted to and/or included in the chassis 110. While the illustrated work system 130 is provided in the form of an air distributor system, it is also contemplated that the work system 130 may take another form, such as that of a tilling system.

The actuator assembly 140 is connected between the chassis 110 and each wing 120, and is operable to pivot the wing(s) 120 between a substantially horizontal first orientation and a substantially vertical second orientation. The actuator assembly 140 includes at least one linear actuator 142 including a body portion 143 pivotably coupled to the chassis 110 and a rod 144 pivotably coupled to a portion of the hinge mechanism 200. As described herein, the actuator 142 is configured to drive the rod 144 between an extended position and a retracted position to pivot the wing(s) 120 between the first orientation and the second orientation. In the illustrated form, the actuator 142 is provided in the form of a hydraulic cylinder that is actuated hydraulically to drive the rod 144 between its extended position and its retracted position, for example under control of the control system of the towing vehicle. It is also contemplated that one or more of the actuators 142 may take another form, such as that of a linear motor.

Figure 4:
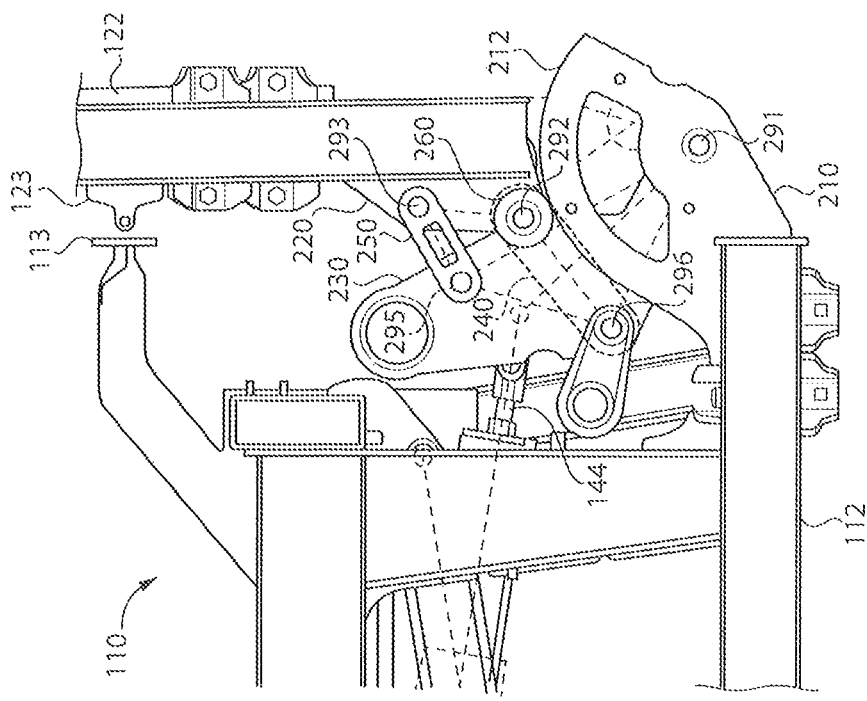
FIG. 4 illustrates the hinge mechanism in a second state corresponding to a second configuration of the work machine.
Figure 3:
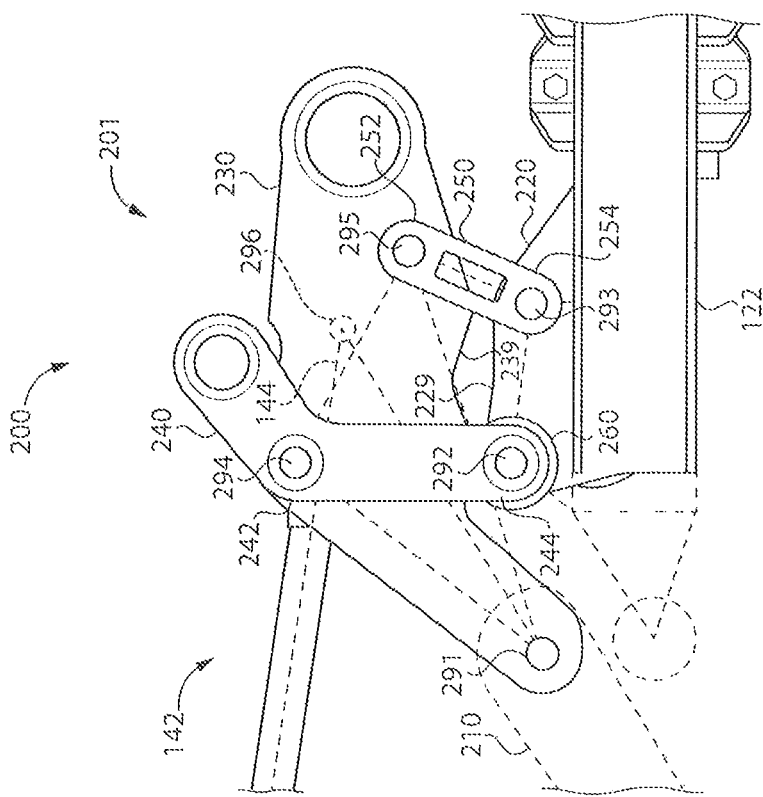
FIG. 3 illustrates a hinge mechanism according to certain embodiments in a first state corresponding to a first configuration of the work machine.

With additional reference to FIGS. 3 and 4, illustrated therein is the hinge mechanism 200 in a first state (FIG. 3) corresponding to the first orientation of the wing 120 and a second state (FIG. 4) corresponding to the second orientation of the wing 120. In the interests of clarity, certain portions of the hinge mechanism 200 are omitted from or illustrated schematically in each of FIGS. 3 and 4. The hinge mechanism 200 generally includes a track plate 210 mounted to the main frame 112, a wing plate 220 mounted to the wing frame 122, a sub-hinge plate 230 pivotably mounted to the track plate 210, a first link 240 pivotably coupled to each of the wing plate 220 and the sub-hinge plate 230, a second link 250 pivotably coupled to each of the wing plate 220 and the sub-hinge plate 230, and a roller 260 rotatably mounted to the wing plate 220. As described herein, the wing plate 220, the sub-hinge plate 230, the first link 240, and the second link 250 cooperate to form a closed four bar linkage 201.

The track plate 210 is securely mounted to the main frame 112, and defines a track 212 operable to engage the roller 260. While other configurations are contemplated, the illustrated track 212 is arcuate. More particularly, the track 212 defines an arc of a circle centered on a first pivot pin 291 by which sub-hinge plate 230 is pivotably mounted to the wing plate 220. In the illustrated form, the track plate 210 is secured to the main frame 112, and may be considered to define a portion of the main frame 112. In certain embodiments, the track plate 210 and/or the track 212 may be considered to constitute a portion of the chassis 110 and/or the main frame 112, and/or may be considered to be defined by the chassis 110 and/or the main frame 112.

The wing plate 220 is securely mounted to the wing frame 122, and in certain embodiments may be considered to constitute a portion of the wing 120 and/or the wing frame 122, and/or may be considered to be defined by the wing 120 and/or the wing frame 122. A second pivot pin 292 rotatably couples the roller 260 with the wing plate 220, and in the illustrated form also pivotably couples the first link 240 with the wing plate 220. It is also contemplated that the first link 240 and the roller 260 may be coupled to the wing plate 220 at different locations, for example by individual pivot pins. A third pivot pin 293 pivotably couples the wing plate 220 with the second link 250 such that the second link 250 is pivotable relative to the wing plate 220. The wing plate 220 further defines an abutment 229 operable to abut a corresponding abutment 239 formed on the sub-hinge plate 230.

The sub-hinge plate 230 is pivotably mounted to the track plate 210 via the first pivot pin 291, is pivotably coupled with the first link 240 via a fourth pivot pin 294, and is pivotably coupled with the second link 250 via a fifth pivot pin 295. In the illustrated form, the rod 144 of the actuator 142 is also pivotably coupled with the sub-hinge plate 230, for example via a sixth pivot pin 296. The sub-hinge plate 230 further defines an abutment 239 operable to abut the corresponding abutment 229 formed on the wing plate 220.

The first link 240 is pivotably coupled to the wing plate 220 via the second pivot pin 292, and is pivotably coupled with the sub-hinge plate 230 via the fourth pivot pin 294. More particularly, a first end portion 242 of the first link 240 is pivotably coupled to the wing plate 220 via the second pivot pin 292, and an opposite second end portion 244 of the first link 240 is pivotably coupled with the sub-hinge plate 230 via the fourth pivot pin 294. As a result, the first link 240 is normally operable to pivot relative to each of the wing plate 220 and the sub-hinge plate 230.

The second link 250 is pivotably coupled to the wing plate 220 via the third pivot pin 293, and is pivotably coupled with the sub-hinge plate 230 via the fifth pivot pin 295. More particularly, a first end portion 252 of the second link 250 is pivotably coupled to the wing plate 220 via the third pivot pin 293, and an opposite second end portion 254 of the second link 250 is pivotably coupled with the sub-hinge plate 230 via the fifth pivot pin 295. As a result, the second link 250 is normally operable to pivot relative to each of the wing plate 220 and the sub-hinge plate 230.

The roller 260 is rotatably mounted to the wing plate 220, for example via the second pivot pin 292. In the illustrated form, the roller 260 is rotatably mounted to the wing plate 220 via the same pivot pin 292 by which the first link 240 is pivotably coupled to the wing plate 220. It is also contemplated that the roller 260 may be rotatably mounted to the wing plate 220 at another location, for example via an additional pivot pin. In certain embodiments, the roller 260 may be considered to constitute a portion of the wing 120 and/or the wing frame 122.

As noted above, the actuator assembly 140 cooperates with the hinge mechanism 200 such that the actuator assembly 140 is operable to pivot the wing(s) 120 between a first orientation and a second orientation. In the illustrated form, the first orientation is a substantially horizontal orientation and the second orientation is a substantially vertical orientation. The term "substantially" as used herein may be applied to modify a quantitative representation that could permissibly vary without resulting in a change in the basic function to which it is related. For example, a substantially horizontal orientation may be an orientation that is within 10° of horizontal or within 20° of horizontal, and a substantially vertical orientation may be an orientation that is within 10° of vertical or within 20° of vertical.

Figure 9:
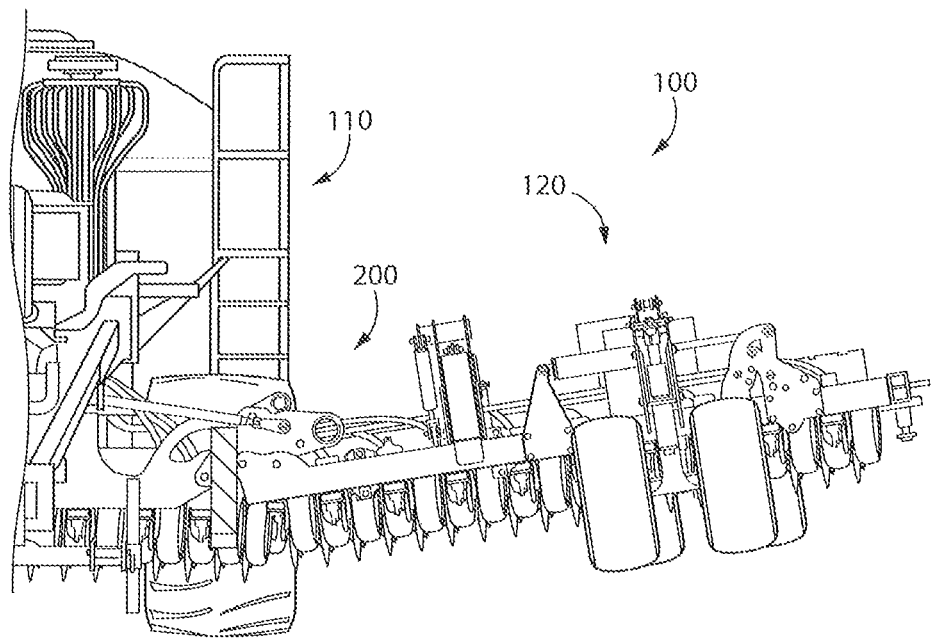
FIG. 9 is a front view of a portion of the work machine with the wing in an upper terminal position.
Figure 10:
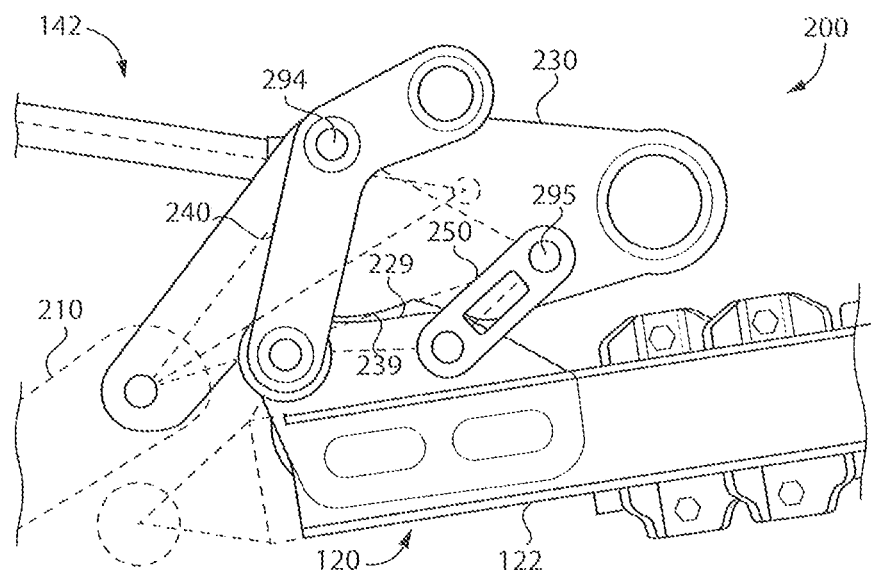
FIG. 10 illustrates the hinge mechanism with the wing in the upper terminal position.

As described herein, the actuator assembly 140 and the hinge mechanism 200 are configured to permit pivoting of the wing 120 through a predetermined pivotal range when the wing 120 is in its first orientation, and to lock the wing 120 in place when the wing 120 is in its second orientation. Thus, when the wing 120 is in its first orientation, the wing 120 is pivotable from a horizontal position (FIGS. 5 and 6) to each of a lower terminal position (FIGS. 7 and 8) and an upper terminal position (FIGS. 9 and 10). Conversely, when the wing 120 is in its second orientation (FIGS. 19 and 20), the wing 120 is locked in position. Thus, the first orientation may be referred to herein as a variable orientation, while the second orientation may be referred to herein as a fixed orientation. In the illustrated form, the wing 120 is vertical when in the fixed second orientation such that an angle defined between the horizontal position and the second orientation is about 90° (e.g., 85° to 95°). It is also contemplated that the angle defined between the horizontal position and the second orientation may be in a different range, such as between 80° and 120°.

Figure 5:
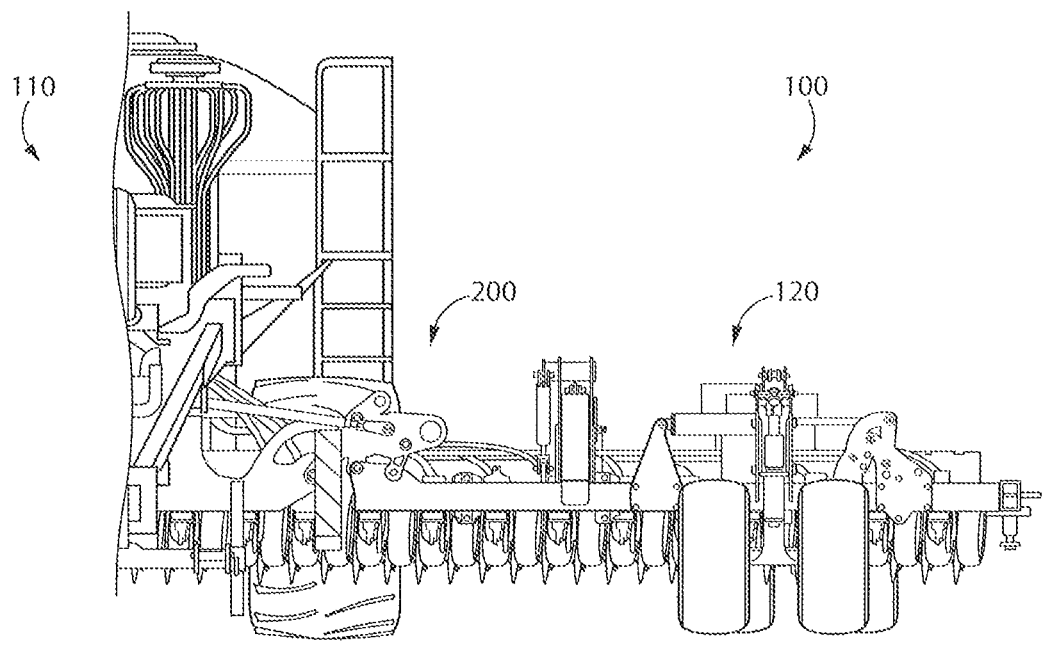
FIG. 5 is a front view of a portion of the work machine with the wing in a horizontal position.
Figure 6:
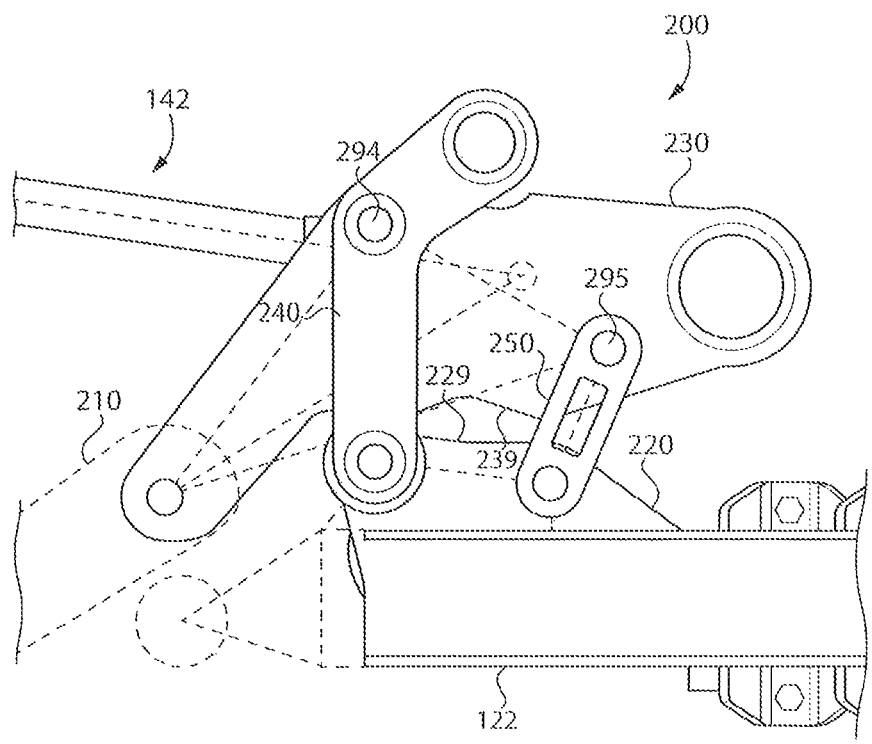
FIG. 6 illustrates the hinge mechanism with the wing in the horizontal position.

With additional reference to FIGS. 5 and 6, illustrated therein are the work machine 100 and the hinge mechanism 200 with the wing 120 in its first orientation. More particularly, FIGS. 5 and 6 illustrate the work machine 100 and the hinge mechanism 200 with the wing 120 at its horizontal position within the variable first orientation. Those skilled in the art will readily recognize that this configuration may occur when the work machine 100 is traveling across relatively level terrain.

In this state, the hinge mechanism 200 is in a home position in which the abutments 229, 239 are separated from one another such that the wing plate 220 is movable relative to the sub-hinge plate 230 by pivoting the links 240, 250 about the pivot pins 294, 295 in either of a first direction (clockwise in FIG. 6) or a second direction (counter-clockwise in FIG. 6). Thus, the wing 120 is movable relative to the chassis 110 toward each of the lower terminal position (FIGS. 7 and 8) and the upper terminal position (FIGS. 9 and 10).

Figure 7:
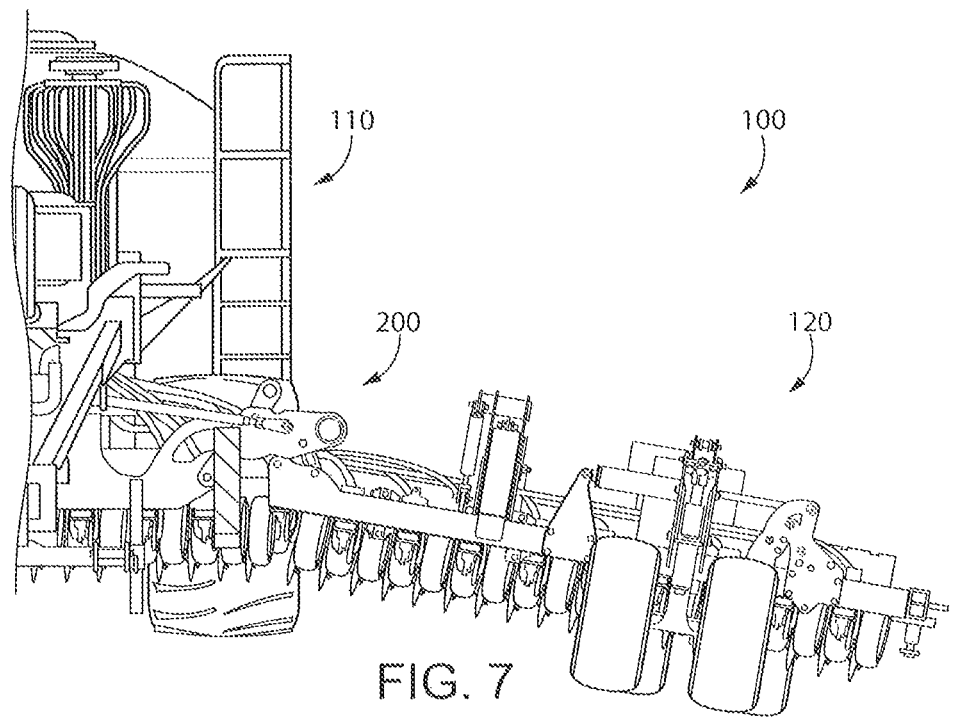
FIG. 7 is a front view of a portion of the work machine with the wing in a lower terminal position.
Figure 8:
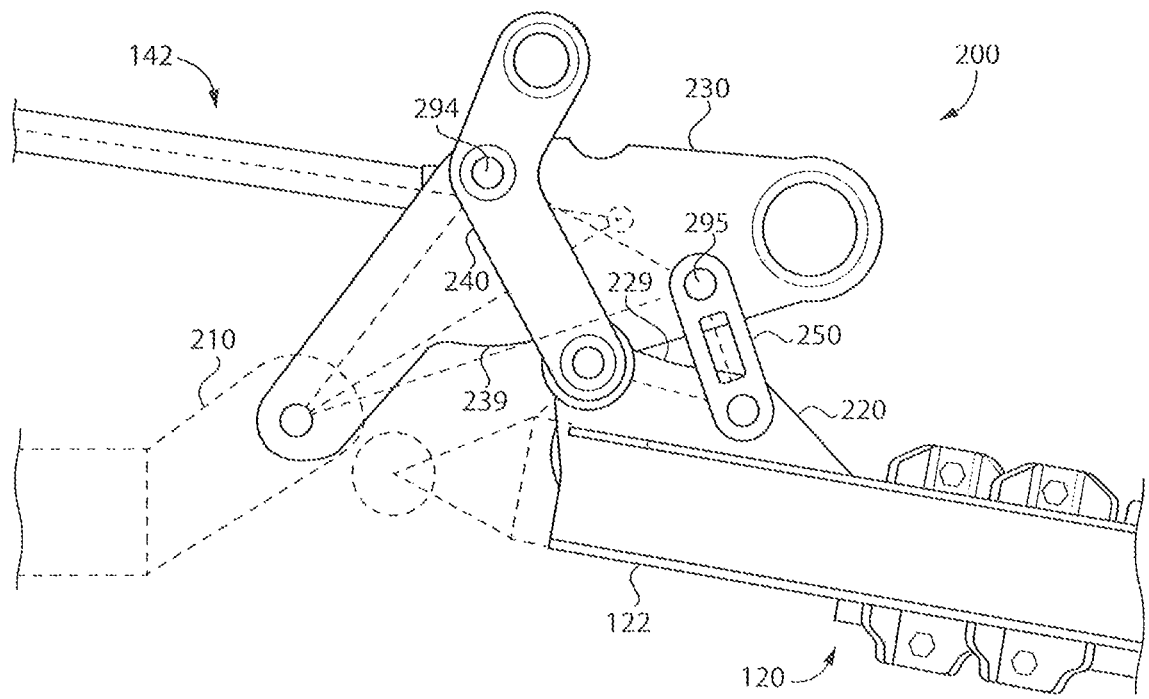
FIG. 8 illustrates the hinge mechanism with the wing in the lower terminal position.

With additional reference to FIGS. 7 and 8, illustrated therein are the work machine 100 and the hinge mechanism 200 with the wing 120 in its first orientation. More particularly, FIGS. 7 and 8 illustrate the work machine 100 and the hinge mechanism 200 with the wing 120 at its lower terminal positon within the variable first orientation. Those skilled in the art will readily recognize that this configuration may occur when the work machine 100 is traveling across terrain that is sloped downward from the chassis 110 such that the chassis 110 is generally higher than the wing 120. In this state, the hinge mechanism 200 is in a first terminal position in which the abutments 229, 239 are engaged with one another such that the wing plate 220 is movable relative to the sub-hinge plate 230 in one direction, but is not movable relative to the sub-hinge plate 230 in the opposite direction. More particularly, the wing plate 220 is movable relative to the sub-hinge plate 230 by pivoting each links 240, 250 about the corresponding pivot pins 294, 295 in the first direction (clockwise in FIG. 8), while the engaged abutments 229, 239 prevent movement of the wing plate 220 relative to the sub-hinge plate 230 in a manner that would pivot the links 240, 250 about the corresponding pivot pins 294, 295 in the second direction (counter-clockwise in FIG. 8). Thus, the hinge mechanism 200 in its first or lower terminal position permits upward movement of the wing 120 toward the horizontal position, but prevents downward movement of the wing 120 beyond the lower terminal position.

With additional reference to FIGS. 9 and 10, illustrated therein are the mobile work machine 100 and the hinge mechanism 200 with the wing 120 in its first orientation. More particularly, FIGS. 9 and 10 illustrate the work machine 100 and the hinge mechanism 200 with the wing 120 at its upper terminal positon within the variable first orientation. Those skilled in the art will readily recognize that this configuration may occur when the work machine 100 is traveling across terrain that is sloped upward from the chassis 110 such that the chassis 110 is generally lower than the wing 120. In this state, the hinge mechanism 200 is in a second terminal position in which the abutments 229, 239 are once again engaged with one another such that the wing plate 220 is movable relative to the sub-hinge plate 230 in one direction, but is not movable relative to the sub-hinge plate 230 in the opposite direction. More particularly, the wing plate 220 is movable relative to the sub-hinge plate 230 by pivoting each links 240, 250 about the corresponding pivot pins 294, 295 in the second direction (counter-clockwise in FIG. 10), while the engaged abutments 229, 239 prevent movement of the wing plate 220 relative to the sub-hinge plate 230 in a manner that would pivot the links 240, 250 about the corresponding pivot pins 294, 295 in the first direction (clockwise in FIG. 10). Thus, the hinge mechanism 200 in its second or upper terminal position permits downward movement of the wing 120 toward the horizontal position, but prevents upward movement of the wing 120 beyond the upper terminal position.

As should be evident from the foregoing, the illustrated hinge mechanism 200 permits the wing 120 to pivot within a predetermined pivotal range while the wing 120 is in its variable first orientation. While other ranges are contemplated, in the illustrated form, the pivotal range is about 20°. More particularly, each of the lower terminal position (FIGS. 7 and 8) and the upper terminal position (FIGS. 9 and 10) is offset from the horizontal position (FIGS. 5 and 6) by about 10°. It is also contemplated that the hinge mechanism 200 may be configured to permit pivoting through other pivotal ranges, which may not necessarily be centered on the horizontal position.

As noted above, the rod 144 of the actuator 142 is pivotably coupled with the sub-hinge plate 230, which is also pivotably coupled with the track plate 210. Those skilled in the art will readily recognize that it may be advantageous to permit the actuator 142 to remain in a fixed state during travel of the work machine 100 across terrain such that fine control of the actuator 142 is not required. The illustrated hinge mechanism 200 permits the actuator 142 to remain in such a fixed state by accommodating the travel of the wing 120 within its variable first orientation between the upper and lower terminal positions, thereby obviating the need for fine control of the actuator 142 during working operation of the work machine 100.

During working operation and/or field travel, the work machine 100 may be deployed with the wing(s) 120 in the first, substantially horizontal orientation. It may be the case, however, that it is desirable to fold the wing(s) vertically, for example in preparation for road transportation. In such a case, the actuator assembly 140 may be activated to drive the wing(s) 120 from the substantially horizontal orientation to a substantially vertical orientation by driving the rod 144 from its extended position to its retracted position, for example under control of the control system of the towing vehicle.

Figure 11:
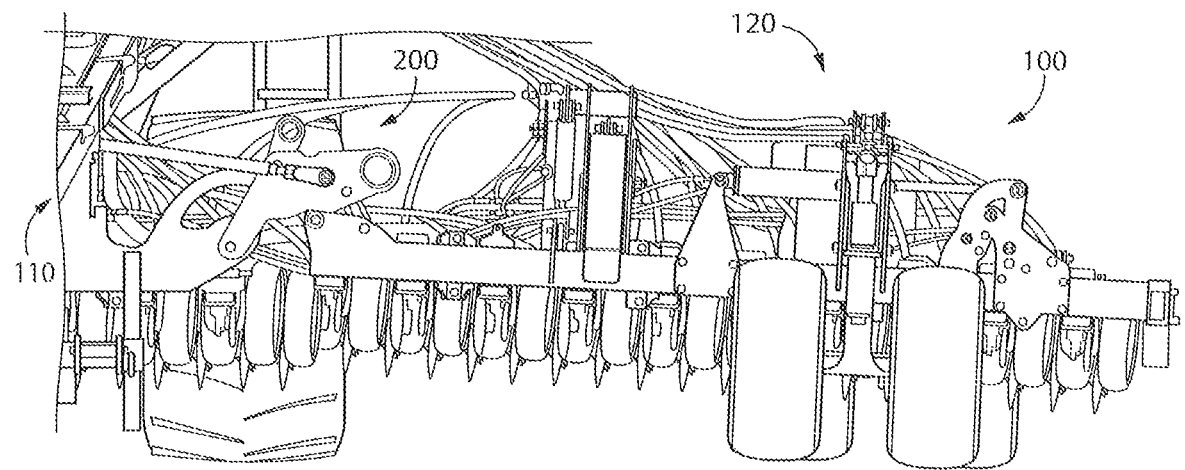
FIG. 11 is a front view of a portion of the work machine in a first transitional state during movement of the wing to transition the work machine between the first configuration and the second configuration.
Figure 12:
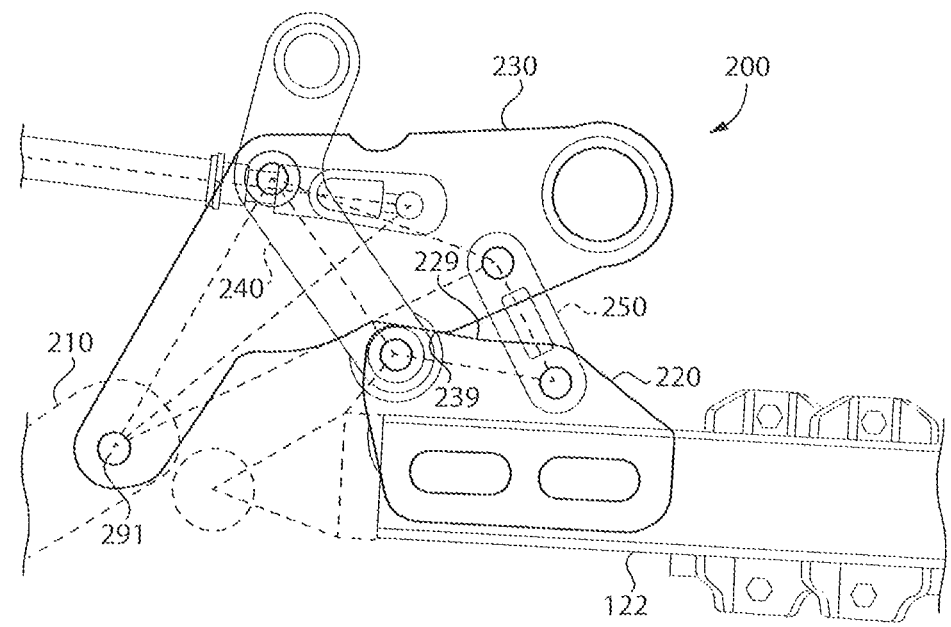
FIG. 12 illustrates the hinge mechanism while the work machine is in the first transitional state of FIG. 11.

With additional reference to FIGS. 11 and 12, illustrated therein are the work machine 100 and the hinge mechanism 200 shortly after retraction of the actuator rod 144 has begun. Such retraction of the rod 144 begins to pivot the sub-hinge plate 230 about the first pivot pin 291 in the second direction (counter-clockwise in FIG. 12) while the links 240, 250 pivot about the pins 294, 295 in the second direction (counter-clockwise in FIG. 12) until the abutments 229, 239 engage one another. With the abutments 229, 239 engaged, continued retraction of the rod 144 begins lifting the wing 120.

Figure 13:
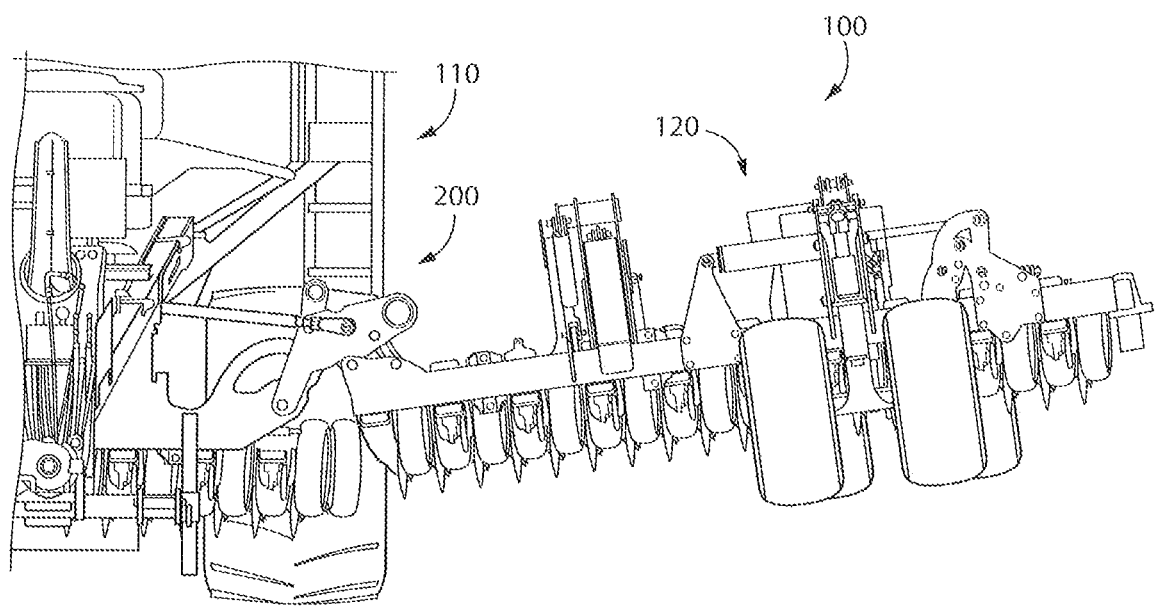
FIG. 13 is a front view of a portion of the work machine in a second transitional state during movement of the wing to transition the work machine between the first configuration and the second configuration.
Figure 14:
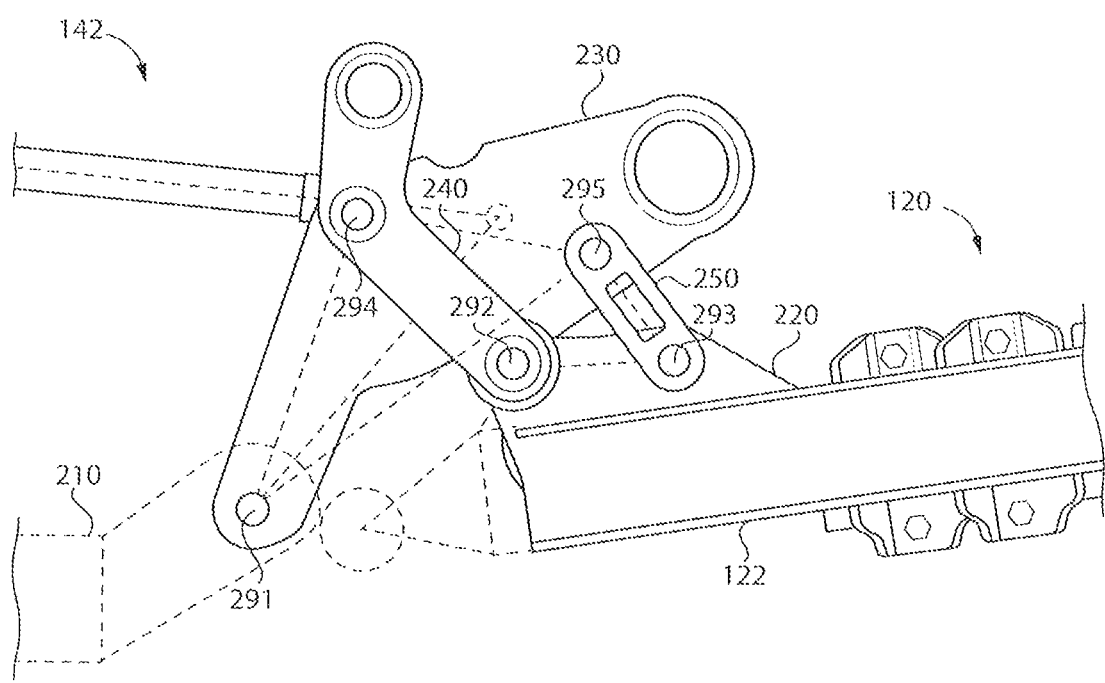
FIG. 14 illustrates the hinge mechanism while the work machine is in the second transitional state of FIG. 13.

With additional reference to FIGS. 13 and 14, illustrated therein are the work machine 100 and the hinge mechanism 200 shortly after the retraction of the rod 144 has begun to lift the wing 120. In this state, the engaged abutments 229, 239 transmit the torque applied to the sub-hinge plate 230 by the actuator assembly 140 to a corresponding torque on the wing plate 220, thereby lifting the wing 120 and driving the wing 120 toward its second, substantially vertical orientation.

Those skilled in the art will readily recognize that as the wing 120 lifts upward, the center of gravity of the wing 120 will shift such that the loads exerted on the links 240, 250 begin to urge the links 240, 250 to pivot about the pins 294, 295 in a manner that would cause the abutments 229, 239 to disengage from one another. Such shifting, if permitted to occur, could cause sudden movement of the wing 120 in a manner that could cause damage to the work machine 100 and/or present a danger to persons in the vicinity of the work machine 100. However, such shifting is substantially prevented by the hinge mechanism 200 as described herein.

Figure 15:
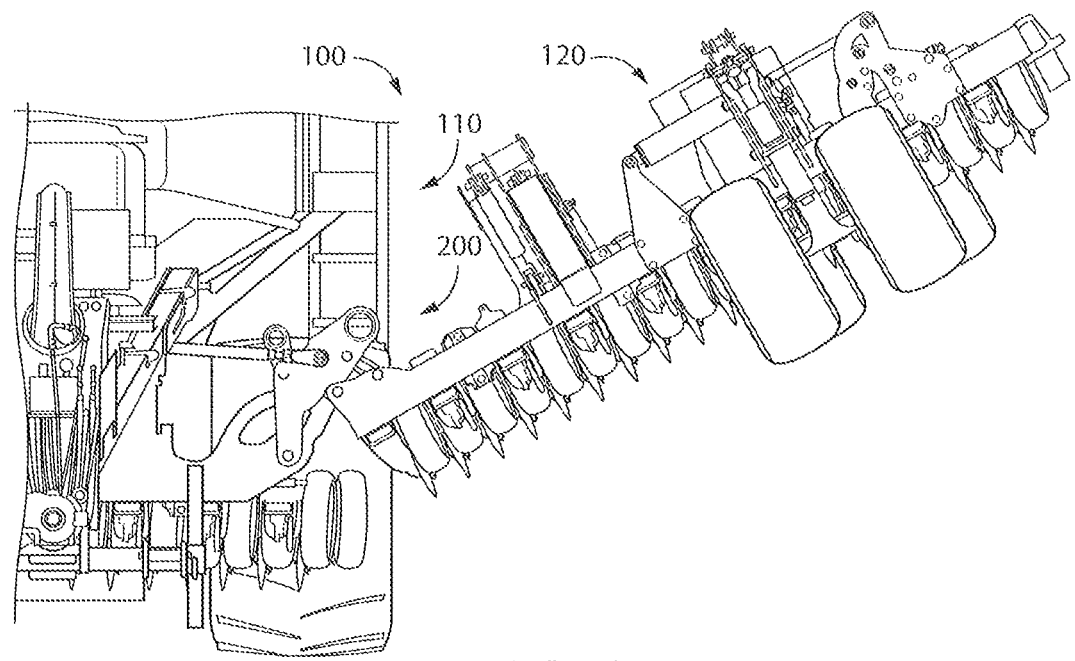
FIG. 15 is a front view of a portion of the work machine in a third transitional state during movement of the wing to transition the work machine between the first configuration and the second configuration.
Figure 16:
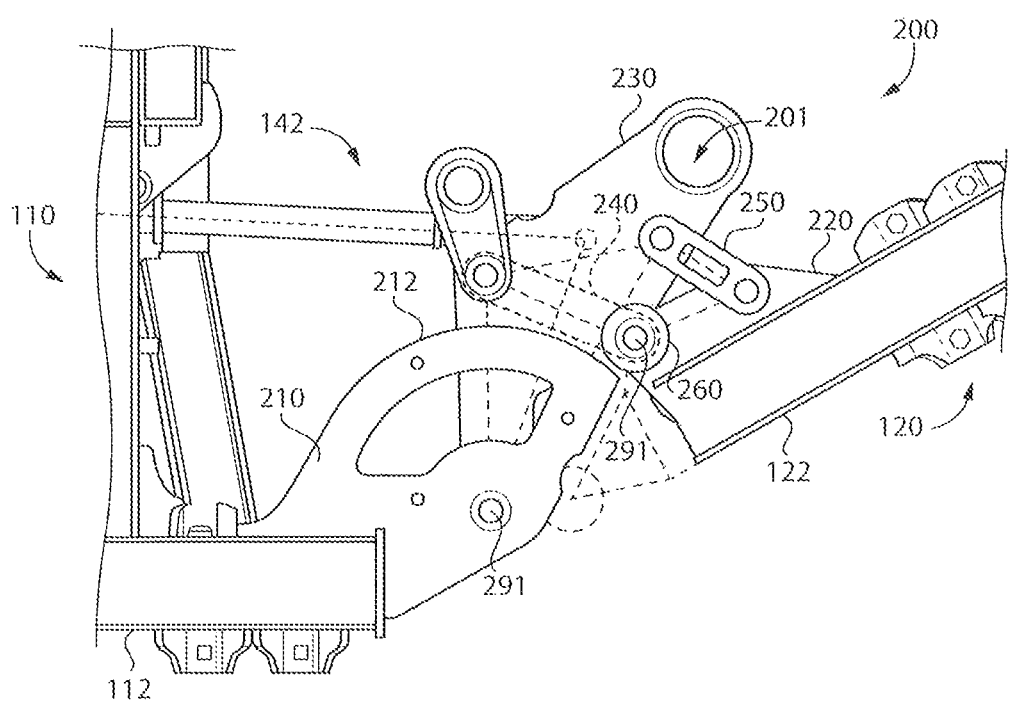
FIG. 16 illustrates the hinge mechanism while the work machine is in the third transitional state of FIG. 15.

With additional reference to FIGS. 15 and 16, continued lifting of the wing 120 causes the roller 260 to engage the track 212. Upon engagement of the roller 260 with the track 212, the track plate 210 begins to provide additional support for the wing 120. More particularly, the track plate 210 locks the four bar linkage 201 in a state in which the abutments 229, 239 are adjacent to and/or engaged with one another. As a result, the shifting loads exerted by the wing 120 are transmitted from the wing plate 220 to the track plate 210 such that the chassis 110 supports the wing 120 and prevents sudden uncontrolled movement of the wing 120.

Figure 18:
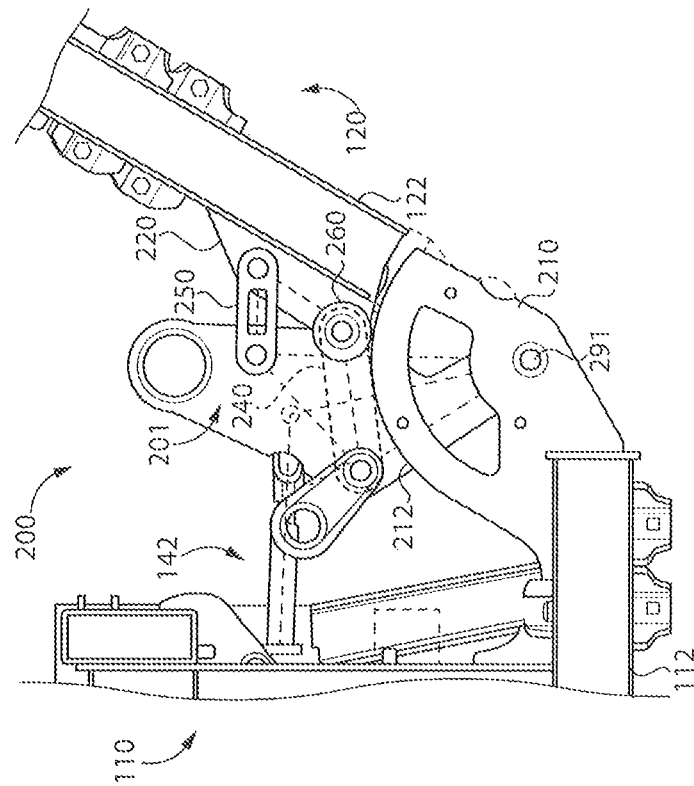
FIG. 18 illustrates the hinge mechanism while the work machine is in the fourth transitional state of FIG. 17.
Figure 17:
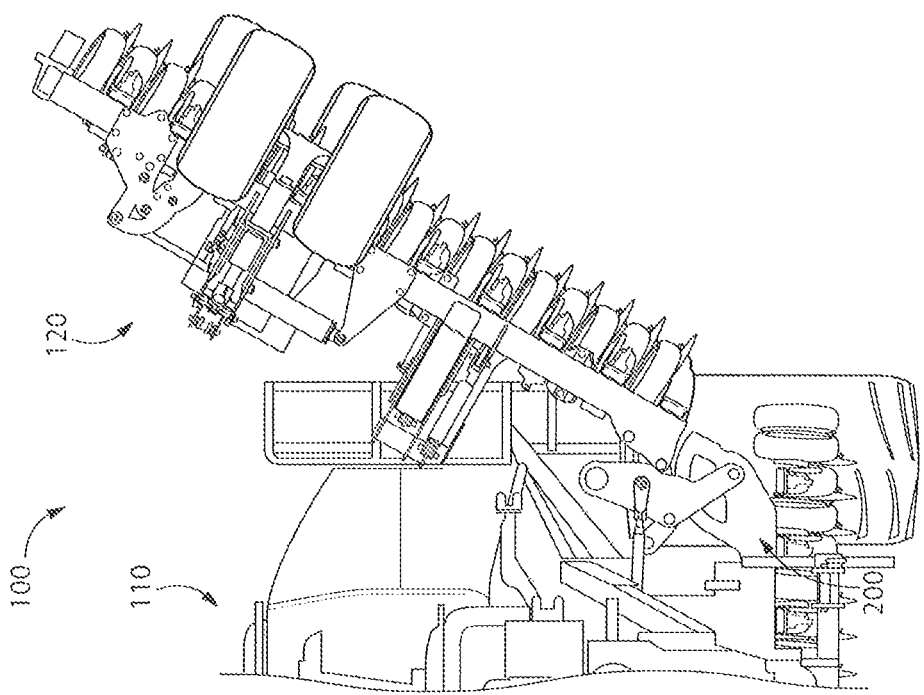
FIG. 17 is a front view of a portion of the work machine in a fourth transitional state during movement of the wing to transition the work machine between the first configuration and the second configuration.

With additional reference to FIGS. 17 and 18, continued lifting of the wing 120 causes the roller 260 to roll along the track 212. Due to the fact that the track 212 is arcuate about the first pivot pin 291, the track plate 210 continues to support the wing 120 as the actuator assembly 140 continues retracting the rod 144 to lift the wing 120. Thus, the four bar linkage 201 remains in its locked condition as the wing 120 travels toward its second orientation.

Figure 20:
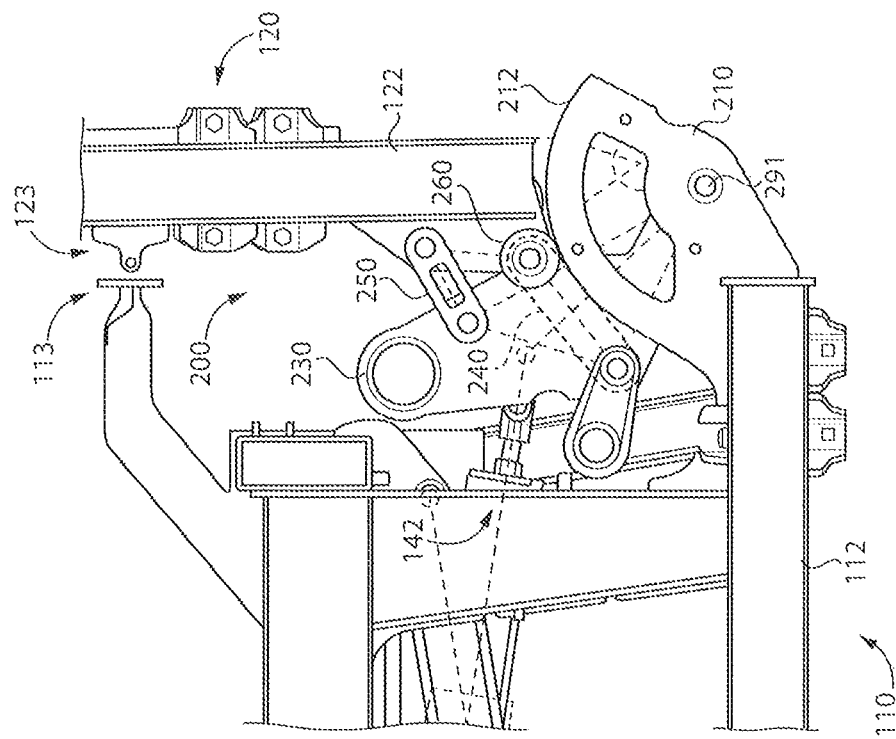
FIG. 20 illustrates the hinge mechanism while the work machine is in the second configuration.
Figure 19:
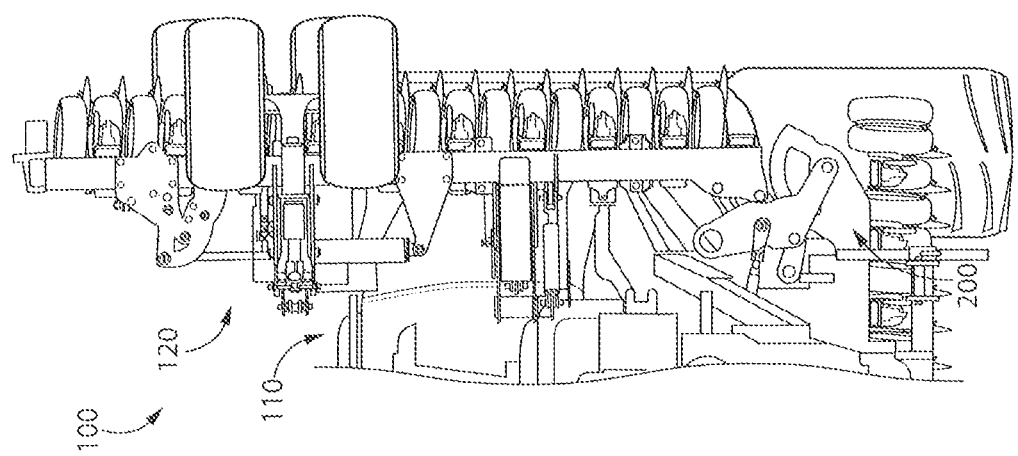
FIG. 19 is a front view of a portion of the work machine in the second configuration.

With additional reference to FIGS. 19 and 20, illustrated therein are the work machine 100 and the hinge mechanism 200 with the wing 120 in its second orientation. In this state, the roller 260 remains engaged with the track 212 while the abutments 229, 239 remain adjacent to and/or engaged with one another. With the actuator 142 in its locked condition, pivoting of the sub-hinge plate 230 about the first pivot pin 291 is prevented. Additionally, pivoting of the wing 120 in one direction is prevented by the engagement between the roller 260 and the track plate 210, while pivoting of the wing 120 in the opposite direction is prevented by engagement of the abutments 229, 239. The chassis 110 and the wing 120 may include stops 113, 123 that further aid in preventing pivoting of the wing 120 toward the chassis 110.

With additional reference to FIGS. 21 and 22, illustrated therein is mobile agricultural equipment 90 including the work machine 100 and a towing vehicle in the form of a tractor 92. More particularly, FIGS. 21 and 22 illustrate the agricultural equipment operating with the work machine 100 in its second configuration, which may be utilized to transport the equipment along paved roads. In certain markets such as Europe, there may be a need for the agricultural equipment 90 to pass through tunnels and/or along bridges that are relatively narrow and/or have relatively low clearance. In order to accommodate such dimensional constraints, the work machine 100 may have dimensions selected to fit within standard dimensions of the roadways along which the equipment 90 will travel during road transport. For example, when the agricultural equipment 90 is in its second configuration, the maximum width W90 of the agricultural equipment 90 may be three meters or less, and the maximum height H90 of the agricultural equipment 90 may be four meters or less. Those skilled in the art will readily appreciate that other dimensional quantities may be utilized, for example in embodiments intended for use in markets in which roads, bridges, and/or tunnels are of different dimensions.

As should be evident from the foregoing, the work machine 100 is capable of being moved from its first or operational configuration to its second or road transport configuration by operating the actuator assembly 140 to retract the rod 144. Such retraction of the rod 144 drives the work machine from the first configuration (FIGS. 5 and 6) to a first transitional configuration (FIGS. 11 and 12) as the rod 144 begins to retract. Continued retraction of the rod 144 drives the work machine 100 to a second transitional configuration (FIGS. 13 and 14) while the roller 260 remains disengaged from the track 212. Further retraction of the rod 144 drives the work machine 100 to a third transitional configuration (FIGS. 15 and 16), at which point the roller 260 begins to engage the track 212 to thereby lock the four bar linkage 201 against internal movement from its current state while permitting pivoting of the four bar linkage 201 about the first pivot pin 291. As the rod 144 continues to retract, the locked four bar linkage 201 pivots about the first pivot pin 291 (FIGS. 17 and 18) until the work machine 100 reaches its second configuration (FIGS. 19 and 20). With the work machine 100 in its second configuration, the actuator assembly 140 locks the rod 144 against movement to thereby lock the wing 120 in its upright position.

Those skilled in the art will readily recognize that the above-described operation for transitioning the work machine 100 from its first or operational configuration to its second or road transport configuration may be performed essentially in reverse by extending the rod 144 to drive the work machine 100 from its second configuration to its first configuration. As the rod 144 begins to extend, the work machine 100 will move from the second configuration (FIGS. 19 and 20) to the fourth transitional configuration (FIGS. 17 and 18) as the roller 260 rolls along the track 212 and retains the four bar linkage 201 in its locked state. Continued extension of the rod 144 moves the work machine 100 to the third transitional configuration (FIGS. 15 and 16), and thereafter to the second transitional configuration (FIGS. 13 and 14) as the roller 260 disengages from the track 212 to thereby unlock the four bar linkage 201 to increase the degrees of freedom for movement of the wing 120 relative to the chassis 110. As the rod 144 approaches its extended position, the work machine 100 moves to the first transitional configuration (FIGS. 11 and 12), and thereafter to the first or operational configuration (FIGS. 5 and 6).

Figure 23:
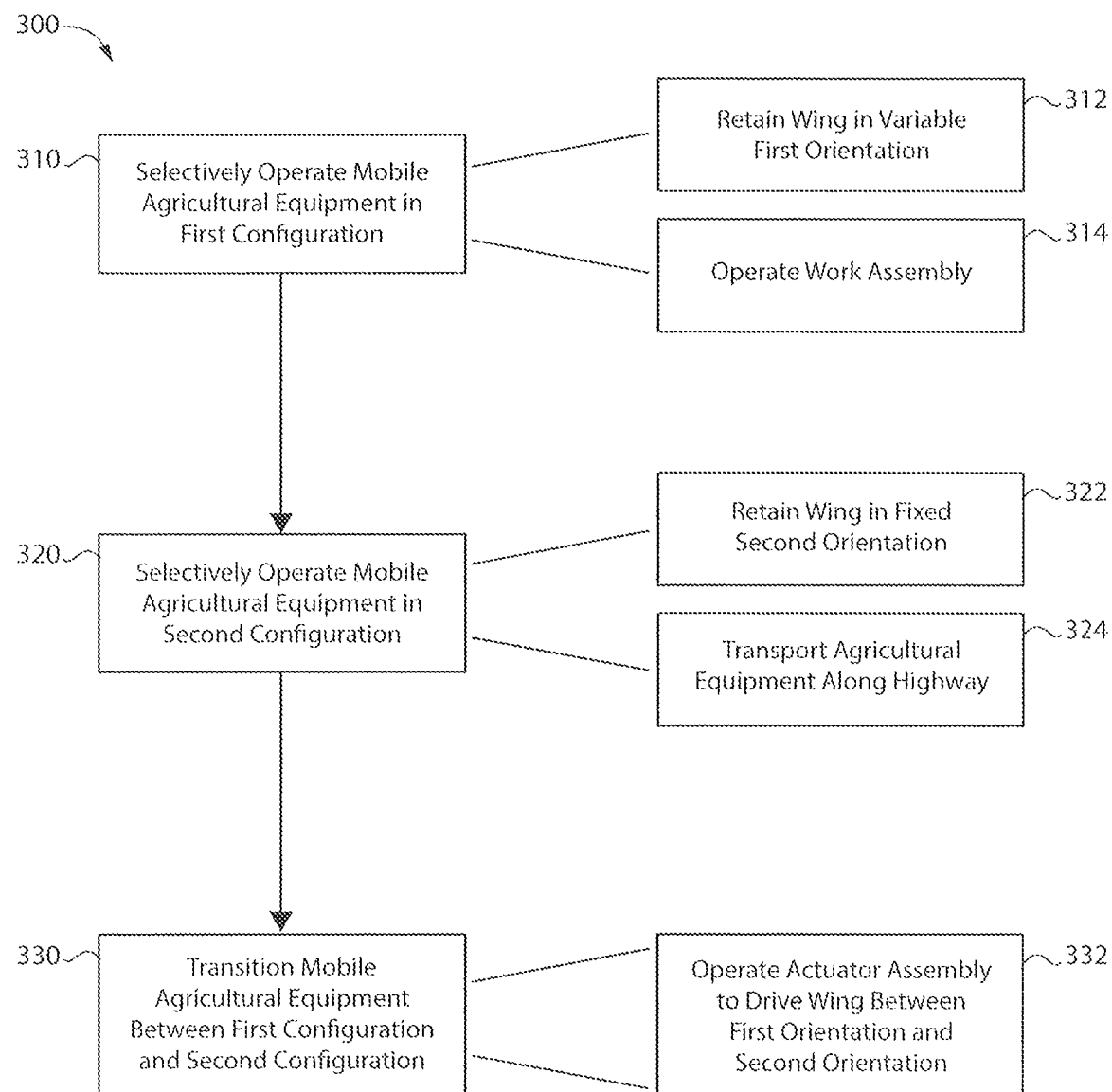
FIG. 23 is a schematic flow diagram of a process according to certain embodiments.

With additional reference to FIG. 23, an exemplary process 300 that may be performed using the work machine 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the work machine 100 and hinge mechanism 200 illustrated in FIGS. 1-20, it is to be appreciated that the process 300 may be performed with agricultural equipment and/or hinge mechanisms having additional or alternative features.

The illustrated process 300 is typically performed with mobile agricultural equipment comprising a chassis, a wing, and a hinge mechanism comprising a four bar linkage coupling the chassis and the wing. For example, the process 300 may be performed with the mobile work machine 100, which generally includes a chassis 110, a wing 120, and hinge mechanism 200 comprising a four bar linkage 201 coupling the chassis 110 and the wing 120. In certain embodiments, the four bar linkage comprises a sub-hinge plate pivotably coupled to the chassis, a wing plate fixedly coupled to the wing, a first link pivotably coupled with each of the sub-hinge plate and the wing plate, and a second link pivotably coupled with each of the sub-hinge plate and the wing plate. For example, the four bar linkage 201 comprises a sub-hinge plate 230 pivotably coupled to the chassis 110, a wing plate 220 fixedly coupled to the wing 120, a first link 240 pivotably coupled with each of the sub-hinge plate 230 and the wing plate 220, and a second link 250 pivotably coupled with each of the sub-hinge plate 230 and the wing plate 220.

The process 300 may include block 310, which generally involves selectively operating the mobile agricultural equipment in a first configuration. For example, block 310 may involve operating the work machine 100 in the first configuration illustrated in FIGS. 5-10. Block 310 includes block 312, which generally involves retaining the wing in a variable first orientation relative to the chassis. For example, block 312 may involve retaining the wing 120 in the variable first orientation as described above with reference to FIGS. 5-10. Block 312 may involve limiting the variable first orientation to a specified angular range, such as an angular range of about 3°, an angular range of about 10°, an angular range of about 30°, an angular range between about 3° and about 30°, or an angular range between about 10° and about 30°.

Block 310 may further include block 314, which generally involves operating a work assembly of the mobile agricultural equipment to thereby perform a primary function of the mobile agricultural equipment. For example, block 314 may involve operating the work assembly 130 of the work machine 100 to perform a primary function of the work machine 100. As noted above, while the primary function of the illustrated work machine 100 is distribution of agricultural product, it is also contemplated that the concepts described herein may be used with agricultural equipment having a different primary function, such as tilling.

The process 300 may include block 320, which generally involves selectively operating the mobile agricultural equipment in a second configuration. For example, block 320 may involve operating the work machine 100 in the second configuration illustrated in FIGS. 19 and 20. Block 320 may include block 322, which generally involves retaining the wing in a fixed second orientation relative to the chassis. For example, block 322 may involve retaining the wing 120 in a fixed substantially vertical orientation as described above. Block 320 may include block 324, which generally involves transporting the agricultural equipment along a paved road.

The process 300 includes block 330, which generally involves transitioning the mobile agricultural equipment between the first configuration and the second configuration. For example, block 330 may involve transitioning the work machine 100 between the first configuration illustrated in FIGS. 5-10 and the second configuration illustrated in FIGS. 19 and 20. Block 330 may include block 332, which generally involves operating an actuator assembly of the agricultural equipment to drive the wing between the variable first orientation and the fixed second orientation. For example, block 332 may involve operating the actuator assembly 140 to drive the wing 120 between the variable first orientation and the fixed second orientation as described above. During performance of block 330, a roller of the wing may contact a track of the chassis during a portion of the transitioning to thereby lock the four bar linkage during the portion of the transitioning. For example, the roller 260 of the wing 120 may contact the track 212 of the chassis 110 during a portion of the transitioning to thereby lock the four bar linkage 201 during such portion of the transitioning as described above.

As noted above, the blocks of the illustrated process may be reordered as desired during performance of the process 300 to achieve a desired result. For example, an embodiment of the process 300 may begin with the agricultural equipment in its second configuration for transport to a work site. Upon reaching the work site, block 330 may be performed to transition the work machine 100 from its second or road transport configuration to its first or operational configuration, and block 310 may then be performed to utilize the work machine 100 to perform its primary function (e.g., distribution of agricultural product and/or tilling). Upon completion of the primary function, block 330 may be performed to transition the work machine 100 from its first or operational configuration to its second or road transport configuration in preparation for performance of block 320.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. Mobile agricultural equipment, comprising:
a main frame defining a track;
a wing frame having a roller rotatably mounted thereon; and
a hinge mechanism movably coupling the main frame with the wing frame such that the wing frame is movable relative to the main frame between a first orientation and a second orientation, the hinge mechanism comprising:
a sub-hinge plate pivotably coupled with the main frame;
a first link pivotably coupled to each of the wing frame and the sub-hinge plate; and
a second link pivotably coupled to each of the wing frame and the sub-hinge plate;
wherein the roller is configured to travel along the track during a portion of a movement of the wing frame between the first orientation and the second orientation to thereby provide support for the wing frame; and
wherein the wing frame, the sub-hinge plate, the first link, and the second link define a closed four bar linkage.

2. The mobile agricultural equipment of claim 1, wherein the four bar linkage is locked when the roller is engaged with the track.

3. The mobile agricultural equipment of claim 1, further comprising an actuator assembly mounted to the main frame and engaged with the sub-hinge plate, wherein the actuator assembly is operable to pivot the sub-hinge plate relative to the main frame to thereby drive the wing frame between the first orientation and the second orientation.

4. The mobile agricultural equipment of claim 1, wherein the first orientation is a substantially horizontal orientation; and
wherein the second orientation is a substantially vertical orientation.

5. The mobile agricultural equipment of claim 1, wherein the first link is pivotably coupled to the wing frame via a pivot pin; and
wherein the roller is rotatably mounted to the pivot pin.

6. The mobile agricultural equipment of claim 1, wherein the sub-hinge plate is pivotable relative to the main frame about a pivot pin; and
wherein the track is arcuate about the pivot pin.

7. The mobile agricultural equipment of claim 1, wherein the roller is disengaged from the track when the wing frame is in the first orientation.

8. Mobile agricultural equipment, comprising:
a chassis, the chassis comprising:
a main frame;
a first ground interface mechanism mounted to the main frame; and
a track plate mounted to the main frame, the track plate defining a track;
a wing movably coupled to the main frame via a hinge mechanism, the wing comprising:
a wing frame;
a second ground interface mechanism mounted to the wing frame; and
a roller rotatably mounted to the wing frame and operable to engage the track plate; and
an actuator assembly mounted to the chassis and engaged with the hinge mechanism, wherein the actuator assembly is operable to move the wing relative to the chassis between a first orientation and a second orientation;
wherein the hinge mechanism comprises:
a sub-hinge plate pivotably coupled to the main frame;
a wing plate fixedly coupled to the wing frame;
a first link pivotably coupled with each of the sub-hinge plate and the wing plate; and
a second link pivotably coupled with each of the sub-hinge plate and the wing plate; and
wherein the roller is configured to travel along the track during a portion of the movement of the wing between the first orientation and a second orientation to thereby support the wing during movement of the wing during the portion of the movement.

9. The mobile agricultural equipment of claim 8, wherein the first orientation is a substantially horizontal orientation and the second orientation is a substantially vertical orientation.

10. The mobile agricultural equipment of claim 8, wherein the hinge mechanism is configured to permit limited pivoting of the wing relative to the chassis when the wing is in the first orientation.

11. The mobile agricultural equipment of claim 10, wherein the first orientation is a substantially horizontal orientation; and
wherein the hinge mechanism is configured to permit pivoting of the wing by 5° to 15° from a horizontal plane when the wing is in the substantially horizontal orientation.

12. The mobile agricultural equipment of claim 8, wherein the sub-hinge plate, the wing plate, the first link, and the second link define a closed four bar linkage; and
wherein the four bar linkage is locked in a locked condition when the roller is engaged with the track.

13. A method of operating mobile agricultural equipment, the method comprising:
selectively operating the mobile agricultural equipment in a first configuration, wherein operating the mobile agricultural equipment in the first configuration comprises retaining a wing of the mobile agricultural equipment in a variable first orientation relative to a chassis of the mobile agricultural equipment, wherein the wing is coupled with the chassis via a hinge mechanism comprising a four bar linkage;
selectively operating the mobile agricultural equipment in a second configuration, wherein operating the mobile agricultural equipment in the second configuration comprises retaining the wing in a fixed second orientation relative to the chassis; and
selectively transitioning the mobile agricultural equipment between the first configuration and the second configuration, wherein transitioning the mobile agricultural equipment between the first configuration and the second configuration comprises operating an actuator assembly of the mobile agricultural equipment to drive the wing between the variable first orientation and the fixed second orientation;
wherein a roller of the wing contacts a track of the chassis during a portion of the transitioning to thereby lock the four bar linkage in a locked state during the portion of the transitioning.

14. The method of claim 13, wherein the variable first orientation is a substantially horizontal orientation; and
wherein the fixed second orientation is a substantially vertical orientation.

15. The method of claim 13, wherein the variable first orientation and the fixed second orientation are offset from one another by an angle ranging from 80° to 120°.

16. The method of claim 13, wherein operating the mobile agricultural equipment in the first configuration further comprises operating a work assembly of the mobile agricultural equipment to thereby perform a primary function of the mobile agricultural equipment.

17. The method of claim 13, wherein operating the mobile agricultural equipment in the first configuration further comprises limiting the variable first orientation to an angular range of at least 3° and less than 30°.

18. The method of claim 13, wherein the four-bar linkage comprises:
a sub-hinge plate pivotably coupled to the chassis;
a wing plate fixedly coupled to the wing;
a first link pivotably coupled with each of the sub-hinge plate and the wing plate; and
a second link pivotably coupled with each of the sub-hinge plate and the wing plate.

19. The method of claim 18, wherein the actuator assembly comprises a linear actuator operable to drive a rod between an extended position and a retracted position;
wherein an end of the rod is pivotably coupled to the sub-hinge plate; and
wherein transitioning the mobile agricultural equipment between the first configuration and the second configuration further comprises moving the rod between the extended position and the retracted position.

20. The method of claim 13, wherein the four bar linkage is a closed four bar linkage.

\* \* \* \* \*